(12) United States Patent
Liu et al.

(10) Patent No.: US 11,679,580 B2
(45) Date of Patent: Jun. 20, 2023

(54) CERAMIC SHELL, MOBILE TERMINAL AND METHOD FOR MANUFACTURING CERAMIC SHELL

(71) Applicant: BEIJING XIAOMI MOBILE SOFTWARE CO., LTD., Beijing (CN)

(72) Inventors: Jihong Liu, Beijing (CN); Jinlong Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 1047 days.

(21) Appl. No.: 16/390,036

(22) Filed: Apr. 22, 2019

(65) Prior Publication Data
US 2019/0322082 A1    Oct. 24, 2019

(30) Foreign Application Priority Data

Apr. 24, 2018  (CN) .......................... 201810373473.4

(51) Int. Cl.
| | | |
|---|---|---|
| B32B 18/00 | (2006.01) | |
| C04B 35/48 | (2006.01) | |
| H04M 1/02 | (2006.01) | |

(52) U.S. Cl.
CPC .............. *B32B 18/00* (2013.01); *C04B 35/48* (2013.01); *H04M 1/0293* (2013.01); *C04B 2235/3217* (2013.01); *C04B 2235/3225* (2013.01); *C04B 2235/9661* (2013.01); *C04B 2237/00* (2013.01); *C04B 2237/066* (2013.01); *C04B 2237/068* (2013.01); *C04B 2237/704* (2013.01)

(58) Field of Classification Search
CPC ....... B32B 18/00; C04B 35/48; C04B 35/622; C04B 35/638; C04B 35/645; C04B 2235/3217; C04B 2235/3224; C04B 2235/3225; C04B 2235/3229; C04B 2235/3241; C04B 2235/3262; C04B 2235/3272; C04B 2235/3284; C04B 2235/6025; C04B 2235/3661; C04B 2237/00; C04B 2237/066; C04B 2237/068; C04B 2237/704; G04B 37/22; H04M 1/0293

See application file for complete search history.

(56) References Cited

FOREIGN PATENT DOCUMENTS

| | | |
|---|---|---|
| CN | 104844198 A | 8/2015 |
| CN | 105130430 A | 12/2015 |
| CN | 105584161 A | 5/2016 |

(Continued)

OTHER PUBLICATIONS

Machine Translation of WO 2018-0385569 (Year: 2018).*

(Continued)

*Primary Examiner* — Sathavaram I Reddy
*Assistant Examiner* — Christopher M Polley
(74) *Attorney, Agent, or Firm* — Oblon, McClelland, Maier & Neustadt, L.L.P.

(57) ABSTRACT

The disclosure relates to a ceramic shell, a mobile terminal and a method for manufacturing the ceramic shell. The ceramic shell includes a multi-layer ceramic blank sheet including a plurality of alternately overlapped ceramic blank sheets having at least one white ceramic blank sheet overlapped with at least one color ceramic blank sheet, wherein two of the plurality of alternately overlapped ceramic blank sheets on an outermost side of the multi-layer ceramic blank sheet are both white ceramic blank sheets.

10 Claims, 4 Drawing Sheets

(56) References Cited

FOREIGN PATENT DOCUMENTS

| CN | 107032787 A | 8/2017 |
|---|---|---|
| CN | 107337450 A | 11/2017 |
| WO | WO 2012/023805 A2 | 2/2012 |
| WO | WO 2018/038569 A1 | 3/2018 |

OTHER PUBLICATIONS

Extended European Search Report dated Apr. 26, 2019 in Patent Application No. 18199893.1, 7 pages.
Combined Chinese Office Action and Search Report dated Sep. 27, 2020 in Chinese Patent Application No. 201810373473.4 (with English translation), 15 pages.
Zhao Baojing "Firing Temperature and Volatilization of Pigment" Integrated Circuit Packaging, China Integrated Circuit, May 15, 1993, p. 133 and cover pages (with English translation).

* cited by examiner

CERAMIC SHELL, MOBILE TERMINAL AND METHOD FOR MANUFACTURING CERAMIC SHELL

CROSS-REFERENCE TO RELATED APPLICATIONS

This application is based on and claims priority to Chinese Patent Application No. 201810373473.4, filed on Apr. 24, 2018, the entire contents of which are incorporated herein by reference.

TECHNICAL FIELD

The present disclosure relates to the field of mobile terminals and spare parts thereof, in particularly to a ceramic shell, a mobile terminal and a method for manufacturing the ceramic shell.

BACKGROUND

With the development of communication technology and the upcoming 5G era, communication between mobile terminals will depend more on the transmission of radio signals. However, in the process of transmitting radio signals by electromagnetic waves, a shielding effect of conductive metal materials on the electromagnetic waves may cause communication problems.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a ceramic shell. The ceramic shell includes a multi-layer ceramic blank sheet including a plurality of alternately overlapped ceramic blank sheets having at least one white ceramic blank sheet overlapped with at least one color ceramic blank sheet, wherein two of the plurality of alternately overlapped ceramic blank sheets on an outermost side of the multi-layer ceramic blank sheet are both white ceramic blank sheets.

In an example, each of the two ceramic blank sheets on the outermost side of the multi-layer ceramic blank sheet has a thickness ranging from 0.3 to 0.5 mm.

In another example, the two ceramic blank sheets on the outermost side of the multi-layer ceramic blank sheet have the same thickness.

In yet another example, the white ceramic blank sheet includes at least one white membrane band that has a thickness ranging from 1 to 500 μm.

In yet another example, both the color ceramic blank sheet and the white ceramic blank sheet between any two color ceramic blank sheets have a thickness ranging from 0.001 to 0.3 mm.

In yet another example, the color ceramic blank sheet includes at least one color membrane band that has a thickness ranging from 1 to 500 μm.

Aspects of the disclosure also provide a mobile terminal. The mobile terminal includes a ceramic shell including a multi-layer ceramic blank sheet that includes a plurality of alternately overlapped ceramic blank sheets having at least one white ceramic blank sheet overlapped with at least one color ceramic blank sheet, wherein two of the plurality of alternately overlapped ceramic blank sheets on an outermost side of the multi-layer ceramic blank sheet are both white ceramic blank sheets.

Aspects of the disclosure also provide a method for manufacturing a ceramic shell. The method includes forming, with a white tape casting slurry, at least one white membrane band by a tape casting forming process, while forming, with a color tape casting slurry, at least one color membrane band by the tape casting forming process; overlapping the at least one white membrane band to obtain at least two white ceramic blank sheets, while overlapping the at least one color membrane band to obtain at least one color ceramic blank sheet; overlapping the at least two white ceramic blank sheets and the at least one color ceramic blank sheet to make the white ceramic blank sheet alternately overlapped with the color ceramic blank sheet; conducting a hot pressing process to obtain a ceramic blank, wherein two ceramic blank sheets on an outermost side of the ceramic blank are both white ceramic blank sheets; disposing the ceramic blank together with a shell-forming mold in a vacuum and imposing a first preset temperature and a preset press for a first preset time to obtain a biscuit shell; and debinding and sintering the biscuit shell to obtain the ceramic shell.

In an example, the range of the first preset temperature is 50 to 90 degrees Celsius, the range of the preset press is 100 to 180 MPa, and the range of the first preset time is 30 to 180 seconds.

According to an aspect, before forming the at least one white membrane band and the at least one color membrane band, the method further includes preparing a white ingredient that includes white powder of 45~60% weight, adhesive of 3.5~4.5% by weight, dispersant of 0.2~0.7% by weight, plasticizer of 1.7~2.2% by weight, and solvent of 32.6~49.6% by weight; preparing a color ingredient that includes color powder of 45~60% by weight, adhesive of 3.5~4.5% by weight, dispersant of 0.2~0.7% by weight, plasticizer of 1.7~2.2% by weight, and solvent of 32.6~49.6% by weight; and formulating the white tape casting slurry from the white ingredient and the color tape casting slurry from the color ingredient.

In an example, the white powder includes white zirconium oxide of 93%~97% by weight, yttrium oxide of 3.0%~5.5% by weight and aluminum oxide of 0.25%~10% by weight, and the total weight of the white zirconium oxide, the yttrium oxide and the aluminum oxide in the white powder is no less than 99.5%; and the color powder includes white zirconium oxide of 87%~98.5% by weight, yttrium oxide 0.8%~5% by weight, aluminum oxide of 0.25%~10% by weight and colorant of 0.5%~8% by weight, and the total weight of the white zirconium oxide, the yttrium oxide, the aluminum oxide and the colorant in the color powder is no less than 99.5%.

According to an aspect, debinding and sintering the biscuit shell includes warming the biscuit shell from an ambient temperature to a second preset temperature for debinding; and sintering the biscuit shell for a second preset time at a third preset temperature after debinding.

In an example, the range of the second preset temperature is 600 to 650 degrees Celsius, the range of the third preset temperature is 1350 to 1500 degrees Celsius, and the range of the second preset time is 1 to 4 hours.

According to an aspect, after obtaining the ceramic shell by debinding and sintering the biscuit shell, the method further includes unilateral processing the outermost side of the ceramic shell; and polishing the ceramic shell after unilateral processing.

According to another aspect, before polishing the ceramic shell after unilateral processing, the method further includes disposing the ceramic shell into an annealing furnace for a third preset time at a fourth preset temperature for annealing treatment after unilateral processing.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the disclosure and, together with the description, serve to explain the principles of the disclosure.

Figure 1:
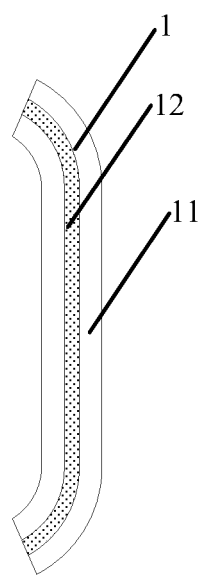
FIG. 1 is a schematic diagram of the section structure of a ceramic shell according to an exemplary aspect of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of illustrative aspects do not represent all implementations consistent with the disclosure. Instead, they are merely examples of apparatuses and methods consistent with aspects related to the disclosure as recited in the appended claims.

For the sake of understanding, the terms and application scenarios involved in the present disclosure are introduced before the detailed explanations of the present disclosure's aspects First, the introduction and explanation of some terms related to the aspects of the present disclosure are as follows:

White Zirconium Oxide:

White zirconium oxide refers to the zirconium oxide whose specific weight of impurity is less than a first preset value, wherein the first preset value may be 0.1% or 0.2%, certainly, the first preset value may also be other values, as long as the color of zirconia is close to white.

Pencil Hardness:

Pencil hardness, also known as Determination of film hardness by pencil test, is a test method and measurement system. Pencil Hardness may be divided into 16 grades: 6B, 5B, 4B, 3B, 2B, B, HB, H, 2H, 3H, 4H, 5H, 6H, 7H, 8H, 9H.

Tape Casting Forming Process

Tape casting forming process refers to a forming process in which mixing the zirconia powder with organic binder, plasticizer, dispersant and so on until well blended to obtain a flowing thick slurry, and then importing the thick slurry into the hopper of tape casting machine, controlling the thickness with a scraper, flowing out to conveyor belt through the feeding nozzle and drying to form a blank sheet.

At last, the application scenarios involved in the aspects of the present disclosure are introduced.

With the development of communication technology, the communication of mobile terminals relays more on the transmission of radio signals. However in the process of transmitting radio signals by electromagnetic waves, in order to avoid the shielding effect of conductive metal materials on the electromagnetic waves, mobile terminal industry may use the ceramic shell prepared by alternately overlapping the white ceramic blank sheet and the color ceramic blank sheet, that is, using the non-metallic shell instead of metallic shell. Besides, due to the higher strength and fracture toughness of the white ceramic blank sheet and more bright colors of the color ceramic blank sheet, the non-metallic shell prepared from the white ceramic blank sheet and the color ceramic blank sheet not only may apply to mobile terminals, but also to MP3, MP4, video cameras, tape recorders and etc.

After introducing the terms and application scenarios involved in the aspects of the present disclosure, the detailed explanations of the present disclosure's aspects are as follows:

FIG. 1 is a schematic diagram of the section structure of a ceramic shell according to an exemplary aspect of the present disclosure. As shown in FIG. 1, the ceramic shell comprises: multi-layer ceramic blank sheets 1, the multi-layer ceramic blank sheets 1 comprise alternately overlapped white ceramic blank sheet 11 and color ceramic blank sheet 12, and two ceramic blank sheets 1 on the outermost side of the multi-layer ceramic blank sheets 1 are both white ceramic blank sheets 11.

Figure 2:
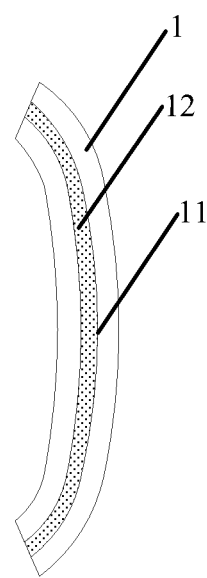
FIG. 2 is a schematic diagram of the section structure of a ceramic shell according to an exemplary aspect of the present disclosure.

Wherein, the two ceramic blank sheets 1 on the outermost side refer to the ceramic blank sheet 1 at the top and the ceramic blank sheet 1 at the bottom in the multi-layer ceramic blank sheets 1. As shown in FIG. 1, the structure of the white ceramic blank sheet 11 and color ceramic blank sheet 12 may be both 2.5D, certainly, as shown in FIG. 2, the structure of the white ceramic blank sheet 11 and color ceramic blank sheet 12 may be both 3D, it is not desired to limit it.

Figure 3:
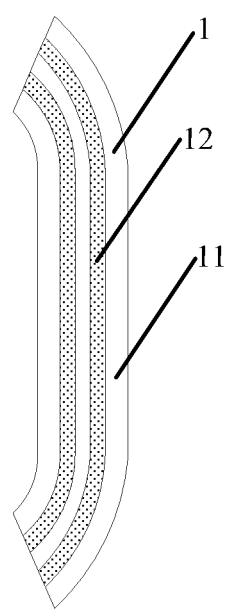
FIG. 3 is a schematic diagram of the section structure of a ceramic shell according to an exemplary aspect of the present disclosure.

Wherein, as shown in FIG. 1, multi-layer ceramic blank sheets 1 comprise two white ceramic blank sheets 11 and one color ceramic blank sheet. Certainly, multi-layer ceramic blank sheets 1 may further comprise N+1 white ceramic blank sheets and N color ceramic blank sheets. For example, as shown in FIG. 3, the multi-layer ceramic blank sheets 1 comprise three white ceramic blank sheets 11 and two color ceramic blank sheets 12, the three white ceramic blank sheets 11 and two color ceramic blank sheets 12 are alternately overlapped, and the two ceramic blank sheets on the outermost side are both white ceramic blank sheets 11. Wherein, N is a positive integer greater than or equal to 2.

According to some aspects, the ceramic shell prepared by alternately overlapping the white ceramic blank sheet and the color ceramic blank sheet, namely the non-metallic shell, may avoid the shielding effect on the electromagnetic waves in the communication process of mobile terminals so that to ensure normal communication of mobile terminals. Besides, due to the higher strength and fracture toughness of the white ceramic blank sheet and more bright colors of the color ceramic blank sheet, the ceramic shell prepared from the white ceramic blank sheet and the color ceramic blank sheet not only satisfies the strength and fracture toughness of the shell, but also satisfies the consumers' requirement for color.

In order to avoid that the ceramic shell prepared from multi-layer ceramic blank sheets 1 is too thick, and thereby increasing the weight of the mobile terminals using the ceramic shell, strengthening the pencil hardness on the surface of the ceramic shell and ensuring the impact strength of the ceramic shell, the two white ceramic blank sheets 11 on the outermost side of the multi-layer ceramic blank sheets 1 should not be too thick or too thin. In practical application, each of the two white ceramic blank sheets 11 on the outermost side of the multi-layer ceramic blank sheets 1 has a thickness ranging from 0.3 to 0.5 mm. Certainly, each of the two white ceramic blank sheets 11 on the outermost side may have other thickness range, such as 0.4~0.7 mm, it is not desired to limit it.

Furthermore, In order to avoid the influence of the color ceramic blank sheet 12 in the multi-layer ceramic blank sheets 1 and the white ceramic blank sheet 11 between any two color ceramic blank sheets 12 on the thickness of the ceramic shell, and thereby resulting in increasing the weight of the mobile terminals using the ceramic shell, the color ceramic blank sheet 12 in the multi-layer ceramic blank sheets 1 and the white ceramic blank sheet 11 between any two color ceramic blank sheets 12 have a thickness ranging from 0.001 to 0.3 mm.

It should be noted that debinding and sintering of the alternately overlapped white ceramic blank sheet 11 and color ceramic blank sheet 12 may be conducted when preparing the ceramic shell. The thickness of the two white ceramic blank sheets 11 on the outermost side may be the same in order to avoid the deformation of the two white ceramic sheets 11 on the outermost side due to different forces during the process of debinding and sintering. Certainly, the thickness difference between the two white ceramic sheets 11 on the outermost side may also be less than a second preset value, as long as no deformation occurs during preparing the ceramic shell, it is not desired to limit it. Wherein, the second preset value may be 0.005 mm, 0.010 mm or 0.015 mm, etc.

During the process of debinding and sintering, the ceramic shell with certain strength may be obtained by removing water, organic matter or volatile matter, etc. in the ceramic shell and increasing the compactness of the ceramic shell. Therefore, in order to facilitate the elimination of water, organic matter or volatile matter, etc., the white ceramic sheet 11 may comprise at least one white membrane band, the color ceramic sheet 12 may comprise at least one color membrane band. In this way, the water, organic matter or volatile matter, etc. may be removed from the ceramic shell along the hole between two adjacent membrane band during the process of debinding and sintering.

Wherein, each of the at least one white membrane band may have a thickness range of 1~500 μm, each of the at least one color membrane band may have a thickness range of 1~500 μm.

According to some aspects, the ceramic shell prepared by alternately overlapping the white ceramic blank sheet and the color ceramic blank sheet, namely the non-metallic shell, may avoid the shielding effect on the electromagnetic waves in the communication process of mobile terminals so that to ensure normal communication of mobile terminals. Besides, due to the higher strength and fracture toughness of the white ceramic blank sheet and more bright colors of the color ceramic blank sheet, the ceramic shell prepared from the white ceramic blank sheet and the color ceramic blank sheet not only satisfies the strength and fracture toughness of the shell, but also satisfies the consumers' requirement for color. In addition, it is more convenient to remove water, organic matter or volatile matter, etc. and increase the compactness of the ceramic shell when preparing the ceramic shell because the white ceramic blank sheet comprises at least one white membrane band, and the color ceramic blank sheet comprises at least one color membrane band.

According to some aspects, it further provides a mobile terminal, the mobile terminal is configured to the ceramic shell as described in the above aspects, in order to avoid shielding of electromagnetic waves from ceramic shell to ensure the normal communication of mobile terminals when using the mobile terminal with the ceramic shell. Besides, the ceramic shell prepared by alternately overlapping the white ceramic blank sheet and the color ceramic blank sheet improves the strength and fracture toughness of the ceramic shell, so as to protect the mobile terminal with the ceramic shell better.

Figure 4:
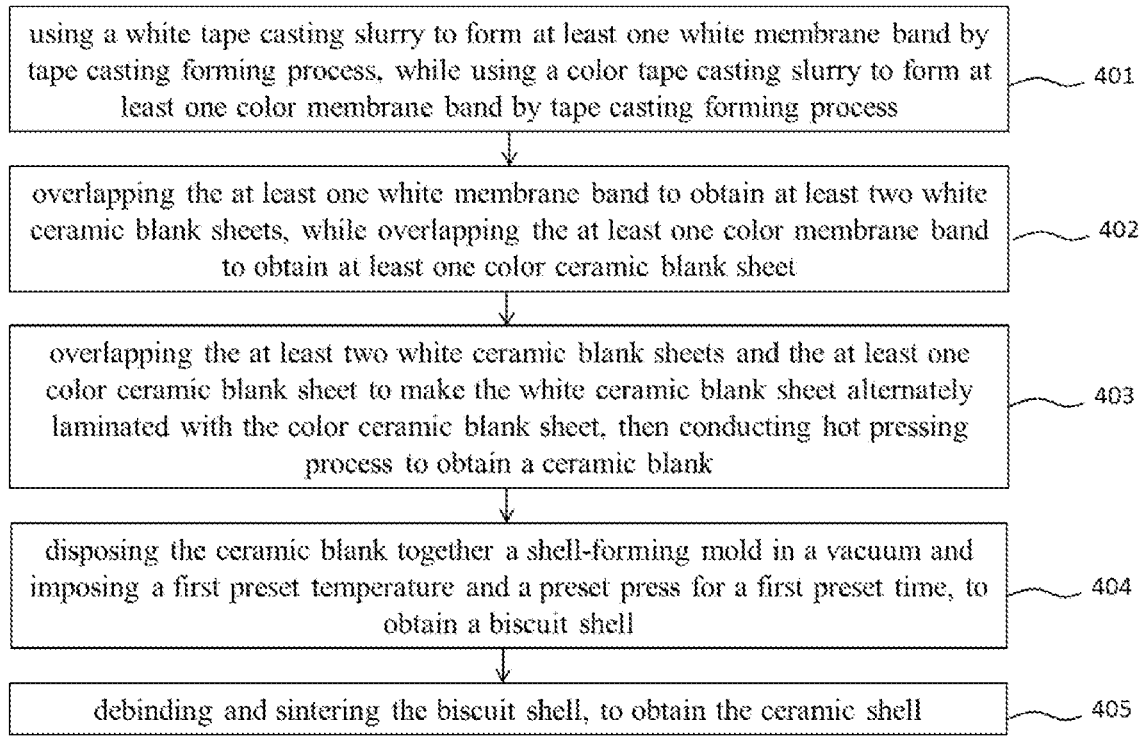
FIG. 4 is a process flow diagram for the method of preparing a ceramic shell according to an exemplary aspect of the present disclosure.

FIG. 4 is a process flow diagram for the method of preparing a ceramic shell according to an exemplary aspect of the present disclosure. As shown in FIG. 4, it comprises the following steps:

In step 401, using a white tape casting slurry to form at least one white membrane band by tape casting forming process, while using a color tape casting slurry to form at least one color membrane band by tape casting forming process.

In practical process, for each white membrane band, the white tape casting slurry is imported into the hopper of tape casting machine, and then flows out to conveyor belt through the feeding nozzle, the thickness of the white tape casting slurry is controlled by a scraper near the feeding nozzle, further, the white membrane band is obtained through drying process. For each color membrane band, the same process above can be used.

Wherein, each white membrane band and each color membrane band obtained by tape casting process may both have a thickness range of 1~500 μm. Certainly, each white membrane band and each color membrane band may have other thickness range, it is not desired to limit it.

It should be noted that each white membrane band and each color membrane band may be obtained not only tape casting forming process but also other forming process, such as injection molding process or slip casting process.

Furthermore, prior preparation of the white tape casting slurry and the color tape casting slurry may be required before providing a white tape casting slurry and a color tape casting slurry to form at least one white membrane band and at least one color membrane band by tape casting forming process respectively.

In practical process, it comprises the following steps (1) to (3):

(1): preparing a white ingredient, the white ingredient comprises white powder of 45~60% by weight, adhesive of 3.5~4.5% by weight, dispersant of 0.2~0.7% by weight, plasticizer of 1.7~2.2% by weight, and solvent of 32.6~49.6% by weight.

Wherein, the total weight of white powder, adhesive, dispersant, plasticizer and solvent may be 100%, certainly, the total weight of white powder, adhesive, dispersant, plasticizer and solvent may also be more than the third preset value and less than 100%, as long as it does not affect the performance of white ingredient. For example, the third preset value may be 99.90%, 99.93% or 99.95%, etc.

It should be noted that the specific weight of white powder, adhesive, dispersant, plasticizer and solvent may also be other range, as long as it does not affect the performance of white ingredient, it is not desired to limit it.

Wherein, the white powder may comprise white zirconia, yttrium(III) oxide and aluminium oxide, and the white zirconia may be 93~97% by weight, the yttrium(III) oxide may be 3.0~5.5% by weight, the aluminium oxide is 0.25~10% by weight, and the total weight of white zirconia, yttrium(III) oxide and aluminium oxide in white powder may be no less than 99.5%.

Wherein, the adhesive is used to bond the white powder to improve the adhesion performance of the white powder, the adhesive may comprise polyvinyl butyral, acrylic resin or polyvinyl alcohol, etc. The dispersant is used to prompt the white powder more evenly dispersed in solvent, the dispersant may be hexenyl distearamide or tristearin, etc. The plasticizer is used to increase toughness of the white powder, the plasticizer may be dioctyl phthalate, diester phthalate or dibutyl phthalate, etc. The solvent is used to dissolve white powder, adhesive, dispersant and plasticizer, the solvent may be ethanol and ether solvent.

(2) Preparing a color ingredient, the color ingredient comprises color powder of 45~60% by weight, adhesive of 3.5~4.5% by weight, dispersant of 0.2~0.7% by weight, plasticizer of 1.7~2.2% by weight, and solvent of 32.6~49.6% by weight.

Wherein, the total weight of color powder, adhesive, dispersant, plasticizer and solvent may be 100%, certainly, the total weight of color powder, adhesive, dispersant, plasticizer and solvent may be more than a third preset value and less than 100%, as long as it does not affect the performance of color ingredient. For example, the third preset value may be 99.90%, 99.93% or 99.95%, etc.

It should be noted that the specific weight of color powder, adhesive, dispersant, plasticizer and solvent may also be other range, as long as it does not affect the performance of color ingredient, it is not desired to limit it.

Wherein, the color powder may comprise white zirconia, yttrium(III) oxide, aluminium oxide and colorant, and the white zirconia may be 87~98.5% by weight, the yttrium(III) oxide may be 0.8~5% by weight, the aluminium oxide may be 0.25~10% by weight, the colorant may be 0.5~8% by weight and the total weight of white zirconia, yttrium(III) oxide, aluminium oxide and colorant in color powder may be no less than 99.5%.

Wherein, the colorant is used for coloring white zirconia, the colorant may be selected from any one or more of erbium oxide, neodymium oxide, praseodymium oxide, cerium oxide, ferric oxide, chromium oxide, manganese oxide, zinc oxide, cobalt oxide magnesium, silicon, calcium, cobalt, nickel, copper, vanadium, cadmium and tin.

(3) Formulating a white tape casting slurry and a color tape casting slurry from the white ingredient and the color ingredient.

For the prepared white ingredient, the white tape casting slurry may be obtained by grinding the white powder in the white ingredient and dissolving the grinded white powder with adhesive, dispersant, plasticizer of the white ingredient in the solvent. For the prepared color ingredient, the color tape casting slurry may be obtained by grinding the color powder in the color ingredient and dissolving the grinded color powder with adhesive, dispersant, plasticizer of the color ingredient in the solvent.

Certainly, the white tape casting slurry and the color tape casting slurry may also be formulated from the white ingredient and the color ingredient in other ways, which is not desired to limit it.

It should be noted that defoaming treatment may also be carried out respectively to increase the viscosity of the white tape casting slurry and the color tape casting slurry. After defoaming, the viscosity range of the white tape casting slurry and the color tape casting slurry may be 600~800 cPa·s.

In step 402, overlapping the at least one white membrane band to obtain at least two white ceramic blank sheets, overlapping the at least one color membrane band to obtain at least one color ceramic blank sheet.

It should be noted that, for the at least two white ceramic blank sheets and the at least one color ceramic blank sheet obtained by overlapping, hot pressing treatment may also be carried out for each white ceramic blank sheet and each color ceramic blank sheet to prevent the at least one white membrane band in each white ceramic blank sheet and the at least one color membrane band in each color ceramic blank sheet from dislocation, so that each of the at least white membrane band's position and each of the at least color membrane band's position may be located.

In step 403, overlapping the at least two white ceramic blank sheets and the at least one color ceramic blank sheet to make the white ceramic blank sheet alternately laminated with the color ceramic blank sheet, then conducting hot pressing process to obtain a ceramic blank, wherein two ceramic blank sheets on the outermost side of the ceramic blank are both white ceramic blank sheet.

When alternately overlapping the at least two white ceramic blank sheets and the at least one color ceramic blank sheet, compared with the color ceramic blank sheet, the color of white ceramic blank sheet is more warm and moist because the pencil hardness of white ceramic blank sheet is greater than that of color ceramic blank sheet. Therefore, the two ceramic blank sheets on the outermost side of the ceramic blank sheets may be both white ceramic blank sheet.

Wherein, each of the two white ceramic blank sheets on the outermost side has a thickness ranging from 0.3 to 0.5 mm, each color ceramic blank sheet and each white ceramic blank sheet between any two color ceramic blank sheets have a thickness ranging from 0.001 to 0.3 mm.

In step 404, disposing the ceramic blank together with a shell-forming mold in a vacuum, imposing a first preset temperature and a preset press for a first preset time, to obtain a biscuit shell.

In practical process, the ceramic blank sheet obtained by hot pressing is pressed against the shell-forming mold, and disposed together into a vacuum packing bag for vacuum sealing for a first preset time at a first preset temperature and a preset press, so as to prompt the ceramic blank sheet forming the biscuit shell whose shape is same as the shell-forming mold. That is, through the vacuum forming process, the ceramic blank sheet forms the biscuit shell with the same shape as the shell-forming mold.

For example, when the structure of the shell-forming mold is 2.5D, the obtained biscuit shell is 2.5D structure. When the structure of the shell-forming mold is 3D, the obtained biscuit shell is 3D structure.

Wherein, the range of the first preset temperature is 50 to 90 degrees Celsius, the range of the preset press is 100 to 180 MPa, the range of the first preset time is 30 to 180 seconds.

It should be noted that, in addition to forming the biscuit shell through the vacuum forming process above, other processes may also be carried out to prompt the ceramic blank sheet forming the biscuit shell whose shape is same as the shell-forming mold, which is not desired to limit it.

In step 405, debinding and sintering the biscuit shell, to obtain the ceramic shell.

The debinding and sintering of ceramic substrate are conducted to avoid the influence of moisture or organics in the ceramic substrate on the physical properties of the ceramic substrate, such as, the tensile strength and impact strength of the ceramic substrate. In practical process, warming the biscuit shell from an ambient temperature to a second preset temperature for debinding, then sintering the biscuit shell treatment for a second preset time at a third preset temperature after debinding.

Wherein, the ambient temperature may be defined as 25 degrees Celsius. Certainly, the ambient temperature may also be defined as 20 degrees Celsius, which is not desired to limit it. The range of the second preset temperature is 600 to 650 degrees Celsius, the range of the third preset temperature is 1350 to 1500 degrees Celsius, the range of the second preset time is 1 to 4 hours.

Wherein, during the process of warming the ceramic substrate from an ambient temperature to a second preset temperature, as the temperature goes up, water and organics in the ceramic substrate slowly evaporate out of the ceramic substrate, at the same time, the volatiles in the ceramic substrate are thermally decomposed and expelled from the ceramic substrates to realize the debinding treatment. When the ceramic substrate is formed through the tape casting forming process, the volatiles may be the adhesive.

It should be noted that the heating rate should not be too high when the ceramic substrate conducts debinding treatment, that is, the time taken to heat up from the ambient temperature to the second preset temperature should not be too short, so as to avoid causing the burst phenomenon of the ceramic substrate. Wherein, the heating rate of debinding treatment may range from 8~13 degrees Celsius/min, certainly, the heating rate may also be in the range of other values, such as, 10~15 degrees Celsius/min, as long as preventing from the burst phenomenon of the ceramic substrate during the debinding treatment.

Wherein, the total surface area of the biscuit shell is larger, that is, the sum of the outer and inner surface area of the ceramic substrate is larger, so when the ceramic substrate conducts sintering treatment after debinding at the third preset temperature, the powder particles on the surface of the ceramic substrate try to move in the direction of low energy because the energy of the powder particles on the surface is higher. In this way, the biscuit shell is promoted to exclude the pores and produce contraction for increasing the compactness of the biscuit shell, to obtain the ceramic shell with certain strength.

Furthermore, the ceramic shell after debinding and sintering treatment may have a thickness ranging from 0.6 to 1.3, the outermost side of the ceramic shell may be conducted unilateral processing, that is, the inner and outer surfaces of the ceramic shell may be conducted unilateral processing, to avoid increasing the weight of the mobile terminal using the thick ceramic shell.

In practical process, the inner and outer surfaces of the ceramic shell may be conducted to remove the substrate with a thickness of 0.2~0.4 mm by Computerized Numerical Control Machine, to ensure the thickness range of the back cover of the mobile terminal shell after machining is 0.3~0.8 mm. Certainly, the outermost side of the ceramic shell may be conducted unilateral processing by other way, which is not desired to limit it.

Furthermore, in order to avoid the concave and convex appearance of the inner and outer surfaces of the ceramic shell after unilateral processing, polishing may also be conducted to ensure the planeness of the inner and outer surfaces of the ceramic shell may be both less than 0.15 mm.

It should be noted that, in order to facilitate the polishing of the inner and outer surfaces of the ceramic shell after unilateral processing, the ceramic shell after unilateral processing may be disposed into an annealing furnace for a third preset time at a fourth preset temperature for annealing treatment. In addition that, the tissue defects and residual stress caused by the process of debinding and sintering may be improved or eliminated to prevent the ceramic shell from deformation or cracking in use when conducting annealing treatment.

Wherein, the fourth preset temperature may be 900 degrees Celsius, the third preset time may be 1 hour. Certainly, the fourth preset temperature may be 850 degrees Celsius, 950 degrees Celsius or 1000 degrees Celsius, the third preset time may be 1.5 hours, 2 hours or 2.5 hours, etc., which is not desired to limit it.

According to some aspects, at least two white ceramic blank sheets are obtained by overlapping at least one white membrane band and at least one color ceramic blank sheet is obtained by overlapping at least one color membrane band, wherein the at least one white membrane band corresponds to the white ingredient prepared by tape casting forming process and the at least one color membrane band corresponds to the color ingredient prepared by tape casting forming process. To ensure that the obtained ceramic shell has sufficient strength and fracture toughness as well as bright colors, the ceramic blank with two white ceramic blank sheets on the outermost side may be prepared by alternatively overlapping the at least two white ceramic blank sheets and the at least one color ceramic blank sheet. Then, the biscuit shell of required shape is obtained by vacuum forming process, such as the biscuit shell of 2.5D structure or 3D structure. After that, the ceramic shell with certain tensile strength and impact strength is obtained by conducting the process of debinding and sintering with the biscuit shell to remove water or organics, etc. in the biscuit shell. The inner and outer surfaces of the ceramic shell may be conducted unilateral processing, to avoid increasing the weight of the mobile terminal using the thick ceramic shell, polishing may also be conducted to ensure the planeness of the inner and outer surfaces of the ceramic shell.

The present disclosure will be further described in the following sections through specific aspects 1 to specific aspects 4.

Specific Aspects 1

Preparing a color powder, the color powder comprises white zirconia of 90.9% by weight (zirconium dioxide of 89.6% by weight, hafnium dioxide of 1.3% by weight), yttrium(III) oxide of 2.45% by weight, colorant of 5.1% by weight (erbium(III) oxide of 4.5% by weight, neodymium (III) oxide of 0.6% by weight), aluminium(III) oxide of 1.25% by weight. Wherein, the specific surface area of color powder is 8.8 $m^2/g$, the corresponding particle size is 0.28 µm when the particle size distribution reaches 50%, the corresponding particle size is 0.49 µm when the particle size distribution reaches 90%.

A color tape casting slurry is prepared from color powder of 50% by weight, polyvinyl butyral of 4.5% by weight, dispersant of 0.4% by weight, plasticizer (dioctyl phthalate) of 2.1% by weight, ethanol and ether solvent of 43% by weight by sand grinding process. After that, the defoaming treatment is carried out to ensure that the viscosity of the color tape casting slurry is 700±100 cPa·s.

The membrane band with the thickness of 18±2 μm is prepared by conducting the tape casting forming process with the color tape casting slurry, and a color ceramic blank sheet with the thickness of 1.1 mm is obtained by overlapping the membrane bands. After that, the color ceramic blank sheet with the thickness of 1.1 mm and 3D mold are disposed into vacuum packing bag for vacuum coating at 70 degrees Celsius and 150 MPa for 90 seconds to obtain a biscuit shell.

The biscuit shell obtained is disposed into a sintering furnace for debinding and sintering treatment, the sintering temperature is 1480 degrees Celsius and the sintering time is 2 hours. The thickness of inner and outer surfaces of the ceramic shell after sintering is removed 0.2 to 0.3 mm by conducting CNC, and then a pinkish purple ceramic shell with the planeness of less than 0.15 mm is obtained after polishing.

The test results show that the bending strength of the ceramic shell is 700 MPa, the fracture toughness Is 4.2, the hardness is 1200, the light transmittance is 35%, and the color model values are 72, 3.8, ~3.7.

Specific Aspects 2

Preparing a color powder, the color powder comprises white zirconia of 95.7% by weight (zirconium dioxide of 94.4% by weight, hafnium dioxide of 1.3% by weight), yttrium(III) oxide of 3.55% by weight, colorant of 0.5% by weight (cerium oxide of 0.50% by weight), aluminium(III) oxide of 0.25% by weight. Wherein, the specific surface area of color powder is 9.2 m$^2$/g, the corresponding particle size is 0.32 μm when the particle size distribution reaches 50%, the corresponding particle size is 0.46 μm when the particle size distribution reaches 90%.

Preparing a white powder, the white powder comprises white zirconia of 96.2% by weight (zirconium dioxide of 94.8% by weight, hafnium dioxide of 1.4% by weight), yttrium(III) oxide of 3.55% by weight, aluminium(III) oxide of 0.25% by weight. Wherein, the specific surface area of white powder is 9.2 m$^2$/g, the corresponding particle size is 0.32 μm when the particle size distribution reaches 50%, the corresponding particle size is 0.46 μm when the particle size distribution reaches 90%.

A color tape casting slurry is prepared from color powder of 50% by weight, polyvinyl butyral of 4.1% by weight, dispersant of 0.4% by weight, plasticizer (dioctyl phthalate) of 2.0% by weight, ethanol and ether solvent of 43.5% by weight by sand grinding process. After that, the defoaming treatment is carried out to ensure that the viscosity of the color tape casting slurry is 700±100 cPa·s.

A white tape casting slurry is prepared from white powder of 50% by weight, polyvinyl butyral of 4.1% by weight, dispersant of 0.4% by weight, plasticizer (dioctyl phthalate) of 2.0% by weight, ethanol and ether solvent of 43.5% by weight by sand grinding process. After that, the defoaming treatment is carried out to ensure that the viscosity of the white tape casting slurry is 700±100 cPa·s.

Eight white membrane bands with the thickness of 120±2 μm is prepared by conducting the tape casting forming process with the white tape casting slurry, one color membrane band with the thickness of 16±2 μm is prepared by conducting the tape casting forming process with the color tape casting slurry. The eight white membrane bands are divided into two groups, each group includes four white membrane bands, a white ceramic blank sheet with 460 μm is obtained by overlapping the four white membrane bands in one group, one color membrane band is determined as one color ceramic blank sheet. After that, a color ceramic blank sheet with 976 μm is obtained by overlapping two white ceramic blank sheets and one color ceramic blank sheet and conducting hot pressing process. Then the color ceramic blank sheet and 3D mold are disposed into vacuum packing bag for vacuum coating at 70 degrees Celsius and 120 MPa for 90 seconds to obtain a biscuit shell.

The biscuit shell obtained is disposed into a sintering furnace for debinding and sintering treatment, the sintering temperature is 1450 degrees Celsius and the sintering time is 2 hours. Then the sintered biscuit shell is disposed into vacuum furnace at 1450 degrees Celsius for 3 hours to conduct reduction reaction, to obtain a black ceramic shell.

The thickness of inner and outer surfaces of the black ceramic shell is removed 0.2 to 0.3 mm by conducting CNC, and then disposed into annealing furnace at 900 degrees Celsius for 1 hour to conduct annealing treatment. A bright red ceramic shell with the planeness of less than 0.15 mm is obtained after polishing.

The test results show that the bending strength of the ceramic shell is 1126 MPa, the fracture toughness Is 6.2, the hardness is 1249, the light transmittance is 18%, and the color model values are 44, 48, 37.

Specific Aspects 3

Preparing a color powder, the color powder comprises white zirconia of 90.90% by weight (zirconium dioxide of 89.60% by weight, hafnium dioxide of 1.3% by weight), yttrium(III) oxide of 2.45% by weight, colorant of 5.10% by weight (cerium oxide of 4.5% by weight, neodymium(III) oxide of 0.60% by weight), aluminium(III) oxide of 1.25% by weight. Wherein, the specific surface area of color powder is 8.8 m$^2$/g, the corresponding particle size is 0.28 μm when the particle size distribution reaches 50%, the corresponding particle size is 0.49 μm when the particle size distribution reaches 90%.

Preparing a white powder, the white powder comprises white zirconia of 89.40% by weight (zirconium dioxide of 88.30% by weight, hafnium dioxide of 1.10% by weight), yttrium(III) oxide of 3.00% by weight, aluminium(III) oxide of 7.5% by weight. Wherein, the specific surface area of white powder is 11.5 m$^2$/g, the corresponding particle size is 0.32 μm when the particle size distribution reaches 50%, the corresponding particle size is 0.46 μm when the particle size distribution reaches 90%.

A color tape casting slurry is prepared from color powder of 50% by weight, polyvinyl butyral of 4.5% by weight, dispersant of 0.4% by weight, plasticizer (dioctyl phthalate) of 2.1% by weight, ethanol and ether solvent of 43% by weight by sand grinding process. After that, the defoaming treatment is carried out to ensure that the viscosity of the color tape casting slurry is 700±100 cPa·s.

A white tape casting slurry is prepared from white powder of 50% by weight, polyvinyl butyral of 4.5% by weight, dispersant of 0.4% by weight, plasticizer (dioctyl phthalate) of 2.1% by weight, ethanol and ether solvent of 43% by weight by sand grinding process. After that, the defoaming treatment is carried out to ensure that the viscosity of the white tape casting slurry is 700±100 cPa·s.

Two white membrane bands with the thickness of 500±20 μm is prepared by conducting the tape casting forming process with the white tape casting slurry, one color membrane band with the thickness of 8±1 μm is prepared by conducting the tape casting forming process with the color tape casting slurry. Each white membrane band is determined as one white ceramic blank sheet, one color membrane band is determined as one color ceramic blank sheet. After that, a ceramic blank sheet with 1008 μm is obtained by overlapping two white ceramic blank sheets and one color ceramic blank sheet and conducting hot pressing process. Then the ceramic blank and 3D mold are disposed into vacuum packing bag for vacuum coating at 70 degrees Celsius and 150 MPa for 90 seconds to obtain a biscuit shell.

The biscuit shell obtained is disposed into a sintering furnace for debinding and sintering treatment, the sintering temperature is 1480 degrees Celsius and the sintering time is 2 hours. The thickness of inner and outer surfaces of the ceramic shell is removed 0.2 to 0.3 mm by conducting CNC, a pinkish purple ceramic shell with the planeness of less than 0.15 mm is obtained after polishing.

The test results show that the bending strength of the ceramic shell is 1158 MPa, the fracture toughness Is 6.4, the hardness is 1312, the light transmittance is 37%, and the color model values are 78, 3.2, −2.7.

Specific Aspects 4

Preparing a color powder, the color powder comprises white zirconia of 91.9% by weight (zirconium dioxide of 90.7% by weight, hafnium dioxide of 1.2% by weight), yttrium(III) oxide of 4.25% by weight, colorant of 3.6% by weight (ferric(III) oxide of 1.2% by weight, cobalt (III) oxide of 2.4% by weight), aluminium(III) oxide of 0.25% by weight. Wherein, the specific surface area of color powder is 9.2 m²/g, the corresponding particle size is 0.32 μm when the particle size distribution reaches 50%, the corresponding particle size is 0.46 μm when the particle size distribution reaches 90%.

Preparing a white powder, the white powder comprises white zirconia of 96.2% by weight (zirconium dioxide of 94.8% by weight, hafnium dioxide of 1.4% by weight), yttrium(III) oxide of 3.55% by weight, aluminium(III) oxide of 0.25% by weight. Wherein, the specific surface area of white powder is 9.2 m²/g, the corresponding particle size is 0.32 μm when the particle size distribution reaches 50%, the corresponding particle size is 0.46 μm when the particle size distribution reaches 90%.

A color tape casting slurry is prepared from color powder of 50% by weight, polyvinyl butyral of 4.5% by weight, dispersant of 0.4% by weight, plasticizer (dioctyl phthalate) of 2.1% by weight, ethanol and ether solvent of 43% by weight by sand grinding process. After that, the defoaming treatment is carried out to ensure that the viscosity of the color tape casting slurry is 700±100 cPa·s.

A white tape casting slurry is prepared from white powder of 50% by weight, polyvinyl butyral of 4.5% by weight, dispersant of 0.4% by weight, plasticizer (dioctyl phthalate) of 2.1% by weight, ethanol and ether solvent of 43% by weight by sand grinding process. After that, the defoaming treatment is carried out to ensure that the viscosity of the white tape casting slurry is 700±100 cPa·s.

Two white membrane bands with the thickness of 500±20 μm is prepared by conducting the tape casting forming process with the white tape casting slurry, one color membrane band with the thickness of 5±1 μm is prepared by conducting the tape casting forming process with the color tape casting slurry. Each white membrane band is determined as one white ceramic blank sheet, one color membrane band is determined as one color ceramic blank sheet. After that, a ceramic blank sheet with 1005 μm is obtained by overlapping two white ceramic blank sheets and one color ceramic blank sheet and conducting hot pressing process. Then the ceramic blank sheet and 3D mold are disposed into vacuum packing bag for vacuum coating at 70 degrees Celsius and 150 MPa for 90 seconds to obtain a biscuit shell.

The biscuit shell obtained is disposed into a sintering furnace for debinding and sintering treatment, the sintering temperature is 1430 degrees Celsius and the sintering time is 2 hours. The thickness of inner and outer surfaces of the sintered ceramic shell is removed 0.2 to 0.3 mm by conducting CNC, a deep green ceramic shell with the planeness of less than 0.15 mm is obtained after polishing.

The test results show that the bending strength of the ceramic shell is 1204 MPa, the fracture toughness Is 6.1, the hardness is 1178, the light transmittance is 24%, and the color model values are 38, −9.5, −7.

After considering the specification and practice of the above disclosure here, those skilled in the art will easily come up the other related aspects. The present disclosure is intended to cover any variation, use or adaptive modification, the variation, use or adaptive modification follow the general principles of this disclosure and involve the common knowledge or conventional technical means in the field which are not disclosed in the present disclosure. The specification and the aspects are considered to be merely exemplary, and the true scope and spirit of the present disclosure will be indicated by the claim below.

It should be understood that the disclosure is not limited to the description above and the exact structures shown in the accompanying drawings, and all alternatives and variations may be done within the scope of the disclosure. The scope of the disclosure is only limited to the claims attached.

What is claimed is:

1. A ceramic shell comprising:
a multi-layer ceramic blank sheet including a plurality of alternately overlapped ceramic blank sheets having at least one white ceramic blank sheet overlapped with at least one color ceramic blank sheet,
wherein two of the plurality of alternately overlapped ceramic blank sheets on an outermost side of the multi-layer ceramic blank sheet are both white ceramic blank sheets,
wherein the white ceramic blank sheet includes at least one white membrane band, the white membrane band is formed with a white tape casting slurry by a white tape casting slurry process, the white tap casting slurry comprises white powder that the white powder comprises white zirconium oxide of 93%~97% by weight, yttrium oxide of 3.0%~5.5% by weight and aluminum oxide of 0.25%~10% by weight, and the total weight of the white zirconium oxide, the yttrium oxide and the aluminum oxide in the white powder is no less than 99.5%, and
wherein the color ceramic blank sheet includes at least one color membrane band, the color membrane band is formed with a color tape casting slurry by a color tape casting slurry process, the color tap casting slurry comprises color powder that the color powder comprises white zirconium oxide of 87%~98.5% by weight, yttrium oxide 0.8%~5% by weight, aluminum oxide of 0.25%~10% by weight and colorant of 0.5%~8% by weight, and the total weight of the white zirconium oxide, the yttrium oxide, the aluminum oxide and the colorant in the color powder is no less than 99.5%.

2. The ceramic shell according to claim 1, wherein each of the two ceramic blank sheets on the outermost side of the multi-layer ceramic blank sheet has a thickness ranging from 0.3 to 0.5 mm.

3. The ceramic shell according to claim 2, wherein the two ceramic blank sheets on the outermost side of the multi-layer ceramic blank sheet have the same thickness.

4. The ceramic shell according to claim 1, wherein the white membrane band has a thickness ranging from 1 to 500 μm.

5. The ceramic shell according to claim 2, wherein the white ceramic blank sheet includes at least one white membrane band that has a thickness ranging from 1 to 500 μm.

6. The ceramic shell according to claim 3, wherein the white ceramic blank sheet includes at least one white membrane band that has a thickness ranging from 1 to 500 μm.

7. The ceramic shell according to claim 1, wherein both the color ceramic blank sheet and the white ceramic blank sheet between any two color ceramic blank sheets have a thickness ranging from 0.001 to 0.3 mm.

8. The ceramic shell according to claim 1, wherein the color membrane band has a thickness ranging from 1 to 500 μm.

9. The ceramic shell according to claim 7, wherein the color ceramic blank sheet includes at least one color membrane band that has a thickness ranging from 1 to 500 μm.

10. A mobile terminal, comprising:
- a ceramic shell including a multi-layer ceramic blank sheet that includes a plurality of alternately overlapped ceramic blank sheets having at least one white ceramic blank sheet overlapped with at least one color ceramic blank sheet,
- wherein two of the plurality of alternately overlapped ceramic blank sheets on an outermost side of the multi-layer ceramic blank sheet are both white ceramic blank sheets,
- wherein the white ceramic blank sheet includes at least one white membrane band, the white membrane band is formed with a white tape casting slurry by a white tape casting slurry process, the white tap casting slurry comprises white powder that the white powder comprises white zirconium oxide of 93%~97% by weight, yttrium oxide of 3.0%~5.5% by weight and aluminum oxide of 0.25%~10% by weight, and the total weight of the white zirconium oxide, the yttrium oxide and the aluminum oxide in the white powder is no less than 99.5%,
- wherein the color ceramic blank sheet includes at least one color membrane band, the color membrane band is formed with a color tape casting slurry by a color tape casting slurry process, the color tap casting slurry comprises color powder that the color powder comprises white zirconium oxide of 87%~98.5% by weight, yttrium oxide 0.8%~5% by weight, aluminum oxide of 0.25%~10% by weight and colorant of 0.5%~8% by weight, and the total weight of the white zirconium oxide, the yttrium oxide, the aluminum oxide and the colorant in the color powder is no less than 99.5%.

* * * * *